(12) United States Patent
Murdock

(10) Patent No.: US 6,430,010 B1
(45) Date of Patent: Aug. 6, 2002

(54) DISC DRIVE READER WITH REDUCED OFF-TRACK PICKUP

(75) Inventor: Edward Stephens Murdock, Edina, MN (US)

(73) Assignee: Seagate Technology, LLC., Scotts Valley, CA (US)

(*) Notice: Subject to any disclaimer, the term of this patent is extended or adjusted under 35 U.S.C. 154(b) by 0 days.

(21) Appl. No.: 09/561,713

(22) Filed: May 1, 2000

Related U.S. Application Data
(60) Provisional application No. 60/132,323, filed on May 3, 1999.

(51) Int. Cl.[7] .................................................. G11B 5/33
(52) U.S. Cl. ........................................................ 360/319
(58) Field of Search ................................ 360/319, 110, 360/125, 126, 318.1, 318, 317; 29/603.16

(56) References Cited

U.S. PATENT DOCUMENTS

| | | | |
|---|---|---|---|
| 4,656,546 A | | 4/1987 | Mallory |
| 4,935,832 A | | 6/1990 | Das et al. |
| 5,012,375 A | | 4/1991 | Nishimura |
| 5,168,408 A | * | 12/1992 | Lazzari ........................ 360/113 |
| 5,436,779 A | * | 7/1995 | Valstyn ........................ 360/113 |
| 5,546,254 A | | 8/1996 | Gill |
| 5,621,595 A | | 4/1997 | Cohen |
| 5,671,105 A | | 9/1997 | Sugawara et al. |
| 5,673,163 A | | 9/1997 | Cohen |
| 5,696,656 A | | 12/1997 | Gill et al. |
| 5,888,411 A | | 3/1999 | Cohen |
| 6,134,088 A | * | 10/2000 | Murari et al. ............ 360/318.1 |

OTHER PUBLICATIONS

*IEEE Transactions on Magnetics*; Sep. 1984; vol. MAG–20; No. 5; Part 1; pp. 862–865.
Sony Presentation "Inductive Write/MR Read Integrated Head" Jan. 1994.
Sony Presentation "Marin Head" Jun. 1994.
Sony Presentation "Marin Head" "Why Vertical MR Head Structure" Nov. 9, 1994.
Sony Presentation, Start for 1.7Gb/squb, Apr. 26,1995.
IEICE Article "IEICE Transactions on Fundamentals of Electronics, Communications and Computer Sciences" vol. E76–A, No. 7, Jul. 1993, pp. 1167–1169.

* cited by examiner

*Primary Examiner*—William Korzuch
*Assistant Examiner*—Christopher R. Beacham
(74) *Attorney, Agent, or Firm*—Merchant & Gould

(57) ABSTRACT

A method and apparatus for reducing the amount of off-track pickup by a read/write head in a disc drive are disclosed. The read element of the head is placed in a separation zone formed between two pole pieces. The separation zone is positioned along with the read element over a current data track. Another separation zone is formed between the two pole pieces at the sides of the read element. This separation zone formed at the sides of the read element is positioned over adjacent data tracks and has a smaller width to prevent the stray magnetic flux from the adjacent tracks from reaching the read element.

19 Claims, 7 Drawing Sheets

DISC DRIVE READER WITH REDUCED OFF-TRACK PICKUP

RELATED APPLICATIONS

This application claims the benefit of provisional application Serial No. 60/132,323, titled VERTICAL GMR READER WITH REDUCED OFF-TRACK PICKUP, filed on May 3, 1999.

TECHNICAL FIELD

The present invention is directed to disc drive heads. Specifically, the present invention is directed to configurations of disc drive readers that reduce the amount of sensed off-track magnetic flux.

BACKGROUND

Disc drives have read and write heads that convert magnetic field lines stored on the disc into electrical signals that are processed to produce computer usable data. The discs have data tracks that are positioned as concentric circles. The read and write heads are positioned over a track by an actuator arm that is driven by a servomechanism. The track contains magnetic field lines whose orientation varies throughout the track. The disc is rotated and the magnetic field lines pass under the read/write head. Magnetic flux emanates from the disc and is sensed by the head.

Data is sequentially read from a track as the disc rotates. Adjacent data tracks rotate by the read head as the current data track rotates directly beneath the head's sensing element. Magnetic flux lines also emanate from adjacent tracks. If the read element in the head is not sufficiently shielded from the adjacent tracks' magnetic flux, the electrical signals generated by the read element may not correctly correspond to the magnetic flux of the current data track. In such a case, the data that results from processing the electrical signal will be invalid. Similarly, when writing data, if the flux emanating from the write head is not contained to the current data track, data contained in the adjacent tracks may become invalid. As the track density increases to provide greater amounts of storage per unit area, the degree of shielding necessary for proper reading and writing of the data must also be increased.

Typically, the read and write portions are joined and have three pole pieces to help shield the read and write processes. A giant magnetoresistive head, known as a spin valve configuration, is shown in FIG. 2 as an example. The pole pieces, 202, 208, and 204, are positioned sequentially. The middle or shared pole piece 208 is shared between the read and write processes. In the write process, the magnetic flux extends from the top pole piece 202 to the shared middle pole piece 208. In the read process, the magnetic flux extends from the bottom pole piece 204 across the gap 206 and through the read element 210 to the shared middle pole piece 208. The magnetic flux originates from magnetic medium 212 that forms the surface of the disc.

Several read elements are available for disc drives. Magnetoresistive (MR) films are one type and are used in the spin valve configuration of FIG. 2. MR elements have an electrical resistance that is directly related to their magnetic orientation (i.e. the direction of a magnetization vector). When an MR element 210 is exposed to magnetic flux, the magnetic orientation of the MR element changes (i.e. the magnetization vector points in a different direction creating an angle between the rest direction and the resulting vector direction), and its electrical resistance is thereby altered. To read the data, MR elements are driven with a constant electric current and a voltage drop across the element changes as the resistance changes in response to the element being exposed to the magnetic flux. The voltage drop is measured and processed to generate the data values sent to the computer system from the disc drive.

As with all read elements, MR elements must be shielded to prevent reading magnetic flux from tracks adjacent to the current data track. FIG. 2-2 shows an air bearing slider (ABS) view of the spin valve configuration shown in FIG. 2. An ABS view is one taken upwardly from the surface of the recording medium into the bottom of the slider. In the prior art, as shown in FIG. 2-2 which is the ABS view taken along line 2-2 of FIG. 2, the two pole pieces 208 and 204 that shield the MR element 210 provide a gap, or separation zone that the MR element 210 resides between. In the spin valve configuration of FIGS. 2 and 2-2, the separation distance is increased at the ends of the pole pieces that lie above the adjacent tracks. The separation distance must be increased to permit electrical connectors 214, 216 and stabilizing magnets 218, 220 to be placed to the sides of the read element 210. These electrical connectors and stabilizing magnets have been omitted from FIG. 2.

In the spin valve configuration, the electrical connectors 214 and 216 are used to supply the biasing current to the GMR (giant magnetoresistive) element and are positioned in the separation zone adjacent to the GMR element. The stabilizing magnets 218 and 220, also positioned within the separation zone adjacent to the GMR element, are used to create a single domain state. The single domain state occurs when the magnetization vectors are consistent throughout the GMR element. The single domain state provides a more accurate voltage drop due to the magnetic flux from the recording medium. Spin valves utilize about 4 sensor layers in the read element with each layer being about 10–50 Å thick. The sensor layers are made of magnetic material and usually 2 layers are placed together to form a pair. Thus the read element contains 2 pairs, and these are separated from one another by a non-magnetic material that conducts electrical current such as copper.

The GMR element's magnetic orientation vectors are important because flux from the recording medium must increase the voltage drop to represent one binary state or decrease the voltage drop to represent the other binary state. Maintaining the angle between the two vectors at 90 degrees is necessary for proper interpretation of the data state because the angle is related to the voltage by a cosine function. If the angle is too close to 0 degrees, then a change in the angle will always result in the voltage increasing. If the angle is too close to 180 degrees, then a change in the angle will always result in the voltage decreasing. In either case, distinguishing a one from a zero is not possible.

The GMR element will have an inherent magnetic orientation vector on each side of the conductor running through the element when no bias current is applied. The films are made so the vector on one side parallel to the vector on the other side, and the vectors typically are parallel with the longitudinal direction of the element. One magnetic film is permanently oriented by a pinning layer that causes the resulting magnetic orientation vectors to create the necessary angle of 90 degrees relative to one another.

Similar to the spin valve, an anisotropic MR configuration uses a single sensor layer in the read element that is about 100–200 Å thick to produce a usable voltage drop. Anisotropic configurations also utilize side conductors to provide the bias current and stabilizing magnets to create the single domain state. Spin valves produce a greater voltage drop for the same amount of flux from the recording medium than do anisotropic MR configurations. However, some potentially troublesome flux from adjacent tracks will be channeled into the read element by the wider separation zones over the adjacent data tracks in both of these configurations. This stray magnetic flux will interfere with the magnetic flux from the current track and may cause invalid data to result.

Rather than using standard anisotropic magnetoresistive heads or spin valve configurations where the biasing current flows through the length of the read element in a direction parallel to the plane of the recording medium as shown in FIGS. 2 and 2-2, some read heads employ vertical giant magnetoresistive (VGMR) read heads. In vertical giant magnetoresistive heads, the current flows perpendicular to the horizontal plane of the recording medium. Thus, electrical conductors are not needed on the sides of the read element that lie over the adjacent data tracks. Instead, conductors are placed above and in some cases below the read element. The stabilizing magnets are not necessary because MR elements used in the vertical configuration can now be manufactured to inherently maintain a single domain state with vectors at 0 degrees when no biasing current is applied. This single domain state is created by techniques well known in the art such as combining shape anisotropy and magnetocrystalline anisotropy. Alternatively, nearby layers of antiferromagnetic or ferromagnetic layers may be added. However, the read element in the vertical configuration is still susceptible to receiving flux emanating from tracks adjacent to the current data track.

A disc drive's read/write head would benefit from shielding configurations that avoid channeling flux from adjacent tracks to the read element. Avoiding the flux from the adjacent tracks ensures the integrity of the data that is being read and enables greater storage per unit area of disc space.

SUMMARY

Accordingly, the present invention is found in a disc drive read head which reduces off-track magnetic pickup by the read element. The embodiments of the present invention are found in a method for configuring the head to avoid the stray magnetic flux. A read element is placed in a first zone formed by the separation between two magnetic pole pieces forming a read gap that shield the read element from the stray magnetic flux. In operation, the read element is positioned over a current data track. A second zone is formed by the separation between the two magnetic pole pieces forming the read gap and in operation is positioned over data tracks that are adjacent to the current data track.

A first separation width is provided for the space between the two magnetic pole pieces for the first separation zone. The first width is great enough to permit the read element to be placed in the first separation zone. In some embodiments, the read element is partially surrounded by a gap and is electrically connected to one of the pole pieces. In others, the read element is completely surrounded by a gap within the first separation zone. The width of this zone is determined by usual considerations of bit resolution and flying height to achieve the necessary read back pulse widths.

A second separation width is provided for the space between the two magnetic pole pieces for the second separation zone. The second separation width is less than the first separation width and may be as small as zero (i.e. the shields may be connected). The lesser width of the second separation zone prevents stray magnetic flux from the adjacent data tracks from reaching the read element.

The present invention may also be found in an apparatus configured to reduce the off-track pick-up. The apparatus is a read/write head that includes the two pole pieces forming the read gap and the read element. The first and second pole pieces are separated in the two zones. The first separation zone has a greater width for the space between the pole pieces and overlays the current data track when installed in the disc drive. The second zone is for placement over data tracks adjacent to a current data track and has the narrower separation for the space between the pole pieces, which prevents the stray flux from reaching the read element. The read element resides within the first zone and senses the flux from the current data track.

Another embodiment of the present invention is found in a read head that reduces the amount of sensed stray magnetic flux. The read head contains a read element that is placed over a current data track in operation of the disc drive. A means for enclosing the read head is provided to reduce the amount of magnetic flux that emanates from tracks adjacent to the current data track and that is sensed by the read element.

These and other features as well as advantages which characterize the present invention will be apparent from a reading of the following detailed description and a review of the associated drawings.

DESCRIPTION OF THE DRAWINGS

FIG. 2-2 shows an ABS view taken along line 2-2 of FIG. 2 of the read portion of the read/write head.

FIG. 3-2 shows an ABS view taken along line 3-2 of FIG. 3 of the read portion.

FIG. 3-3 shows an ABS view from the same vantage point as FIG. 3-2 but of a different example of a read head utilizing the vertical read element geometry with the read element shorted to the pole.

FIG. 4-2 shows an ABS view taken along line 4-2 of FIG. 4 of the read head.

FIG. 4-3 shows an ABS view from the same vantage point as FIG. 4-2 but of a different example of a read head utilizing the vertical read element geometry with the read element folded.

FIG. 5-2 shows an ABS view taken along line 5-2 of FIG. 5 of the read head.

FIG. 6-2 shows an ABS view taken along line 6-2 of FIG. 6 of the read head.

FIG. 7-2 shows an ABS view taken along line 7-2 of FIG. 7 of the read head.

DETAILED DESCRIPTION

Figure 1:
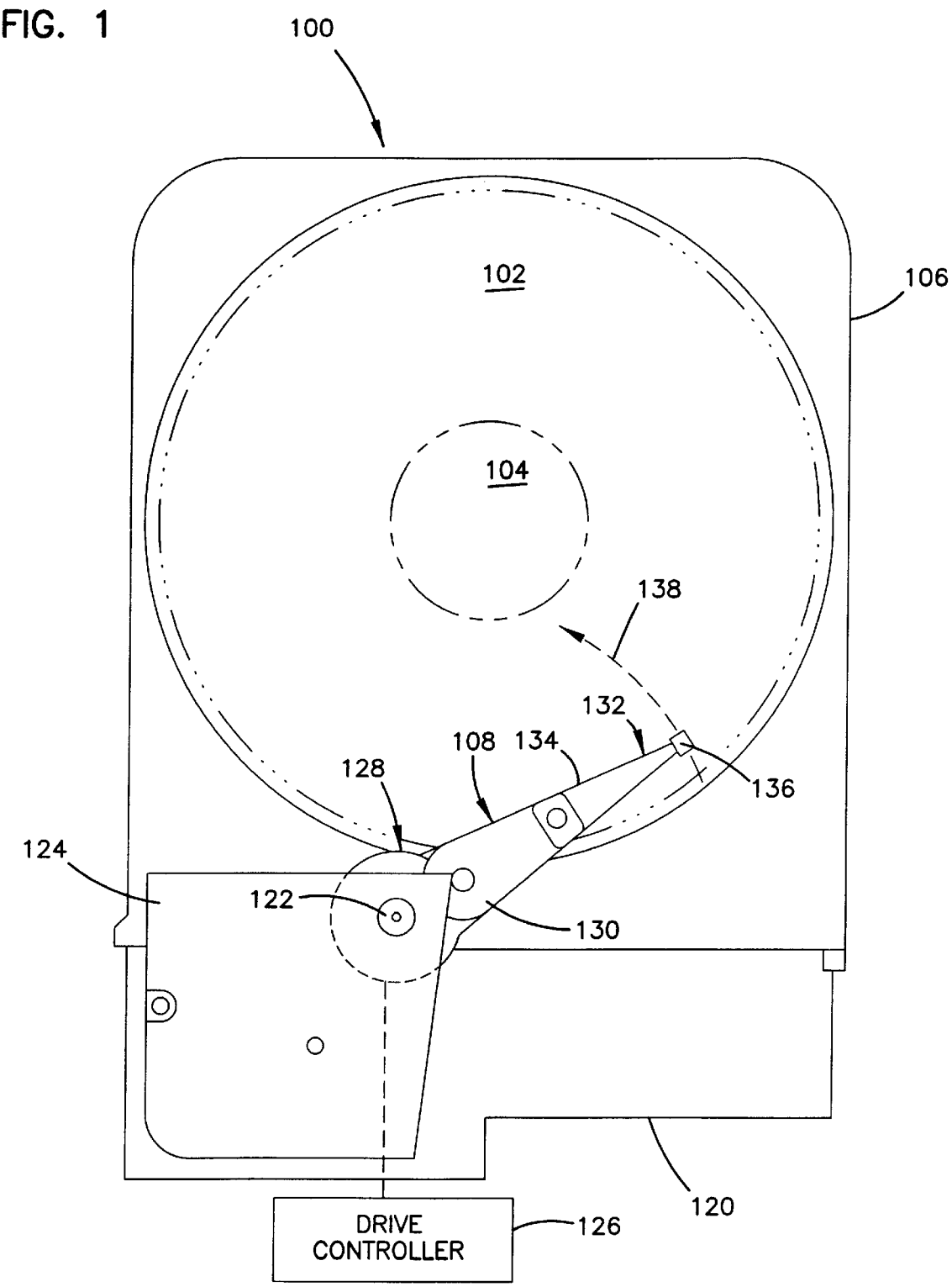
FIG. 1 shows a perspective view of a disc drive with its cover removed.

Referring now to the drawings, in which similar reference numbers are used to denote similar structures or items, FIG. 1 shows a typical disc drive 100. Disc drive 100 includes a magnetic disc 102 mounted for rotational movement about an axis defined by spindle 104 within housing 106. Disc drive 100 also includes a stacked actuator system 108 mounted to a base plate 120 of the housing 106 and pivotally movable relative to disc 102 about axis 122. A cover 124 covers a portion of stacked actuator system 108. Drive controller 126 is coupled to stacked actuator system 108. In a preferred embodiment, drive controller 126 is either mountable within disc drive 100 or is located outside of disc drive 100 with suitable connection to stacked actuator system 108.

In a preferred embodiment, stacked actuator system 108 includes an actuator arm assembly 128, a rigid support member 130, and a head gimbal assembly 132. Head gimbal assembly 132 includes a load beam or flexure arm 134 coupled to rigid member 130, and a slider 136 coupled by a gimbal (not shown) to load beam 134. Slider 136 supports a transducer for reading information from disc 102 and encoding information on disc 102.

During operation, drive controller 126 receives position information indicating a portion of disc 102 to be accessed. Drive controller 126 receives the position information from the operator, from a host computer or from another suitable controller. Based on the position information, drive controller 126 provides a position signal to stacked actuator system 108. The position signal causes stacked actuator system 108 to pivot or rotate about axis 122. This, in turn, causes slider 136 and the transducers mounted on the slider to move radially over the surface of the disc 102 in a generally arcuate path as indicated by arrow 138. Once the transducer is properly positioned, drive controller 126 then executes a desired read or write operation.

The transducer located in the slider 136 contains the magnetic pole pieces and the read element that embody the present invention. As the drive controller 126 executes a desired read operation, magnetic flux from the disc 102 penetrates to the read element and varies its magnetic orientation. As will be discussed below, the embodiments of the present invention provide configurations of the magnetic pole pieces and read element that reduce the amount of sensed magnetic flux that emanates from undesired sources, such as tracks adjacent to the current data track.

In the cutaway plan views provided by FIGS. 3, 4, 5, 6, and 7, the vantage point is between the outer surface of the poles and the read element. Only the poles have been partially cutaway. The read element is fully illustrated in each of the figures.

Figure 3:
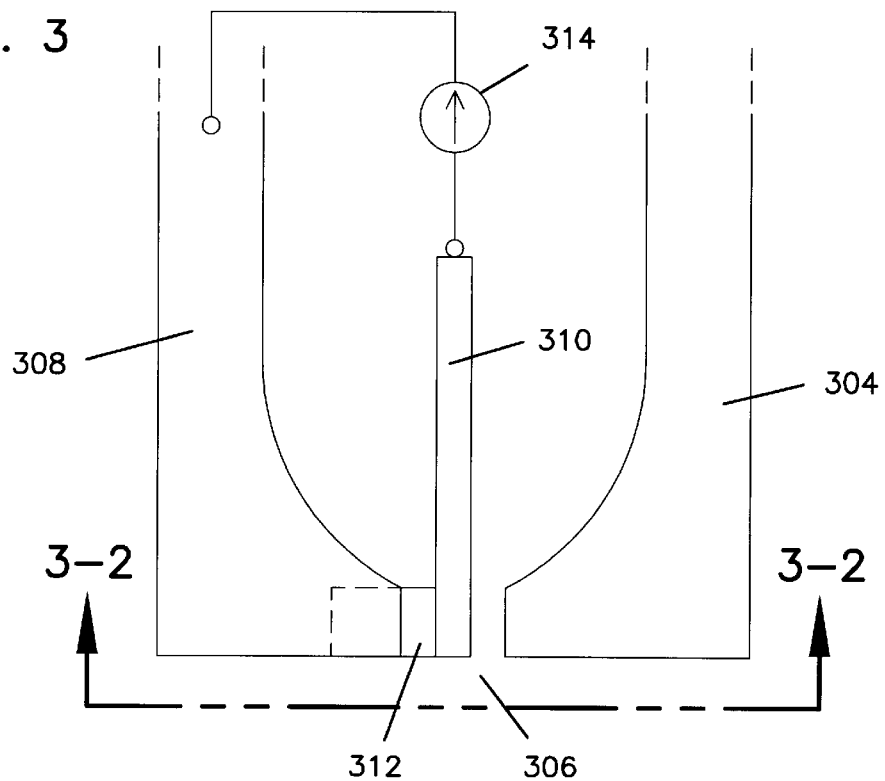
FIG. 3 shows a cutaway plan view of a read head that embodies an example of the present invention in a vertical current geometry with the read element shorted to the pole.
Figures 2, 3:
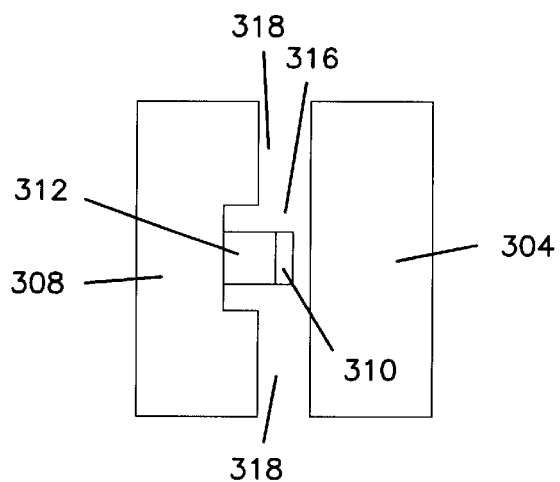
Figure 3:
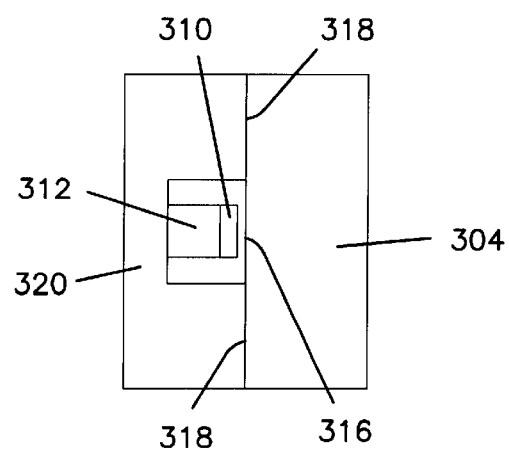

Referring now to FIG. 3, the cutaway view of a read head in a disc drive is shown. The read head contains a shared pole 308 and a bottom shield 304. A gap 306 is provided between the shared pole 308 and bottom shield 304. The read element 310 is positioned within the gap 306. An electrical connector 312 electrically connects the read element 310 with the shared pole 308. A current source 314 provides current that flows through the shared pole 308 and read element 310. Typically, the read element is several stacked layers of magnetoresistive material. Typically, there to will be about 4 sensor layers with each being about 10–50 Å thick.

FIG. 3 shows a vertical current geometry. The current flows vertically through the read element 310. Because the current may flow vertically, no electrical conductors are needed on the sides of the read element that overlay the adjacent data tracks. This can best be seen with reference to FIG. 3-2.

Figure 2:
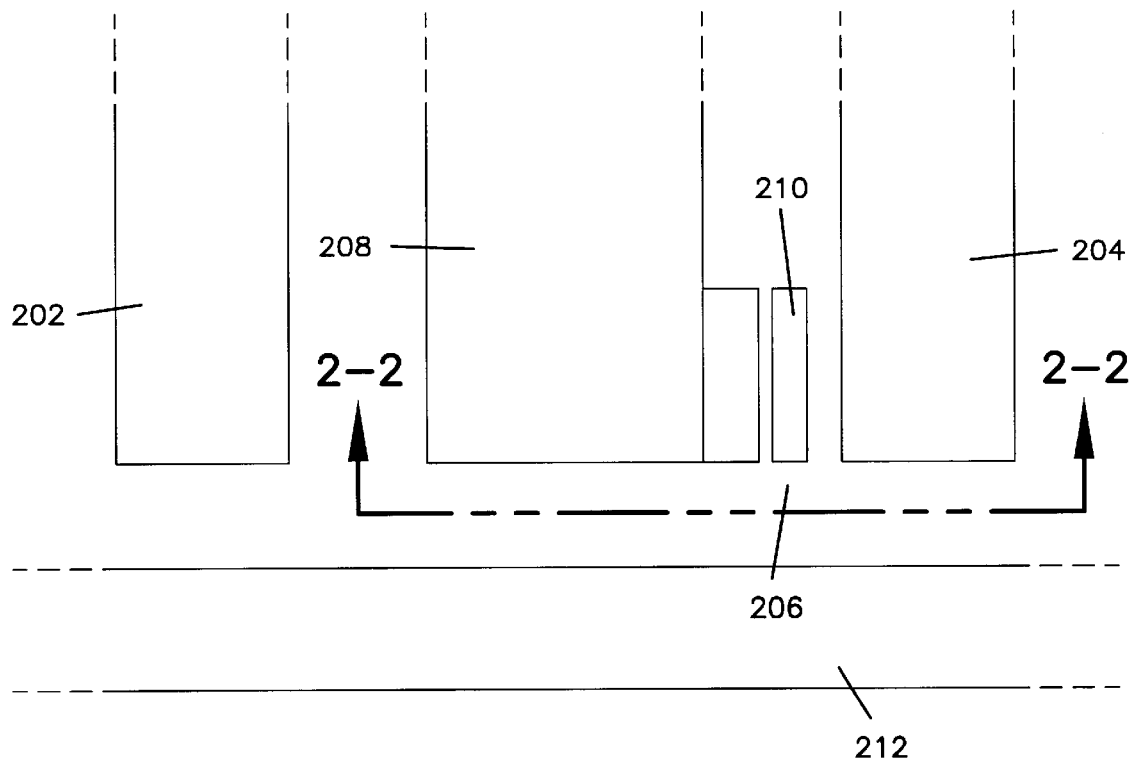
FIG. 2 shows a cutaway plan view of a read/write head of a disc drive placed over the recording medium.
Figure 2:
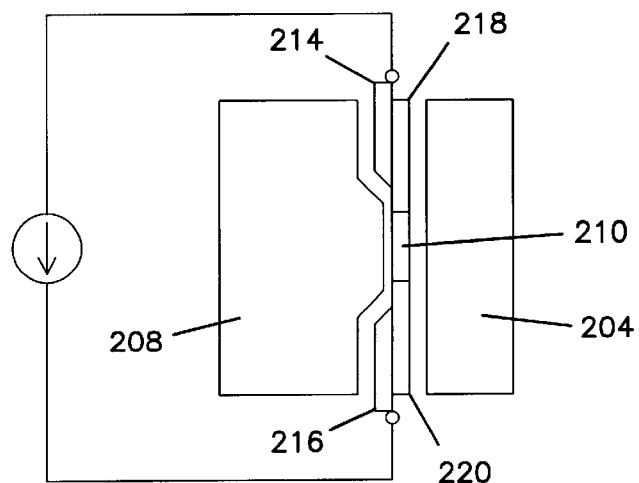

FIG. 3-2 shows an ABS view of the read head of FIG. 3 taken along the line 3-2. The shared pole 308 and the bottom shield or pole 304 are separated by two zones. The first separation zone 316 provides a wide spacing from the pole 308 to the pole 304 and helps enclose the electrical connector 312 and the read element 310. The second separation zone 318 has a width for the spacing between the pole 308 and pole 304 that is less than the width of the first separation zone 316. The lesser width of zone 318 restricts the magnetic flux from the adjacent data tracks that lay beneath it.

The wider zone 316 allows the magnetic flux from the current data track, which lies beneath the first zone 316 and the read element 310, to fully extend into the read element 310.

FIG. 3-3 shows a slight variation of the read head of FIGS. 3 and 3-2. In FIG. 3-3, the second separation width that corresponds to the second separation zone 318 is zero. In the second separation zone 318, the two magnetic pole pieces 320 and 304 have been shorted together. The first separation zone 316 maintains a width greater than zero due to the indentation in the pole piece 320, which exceeds the indentation's depth in pole piece 308 of FIG. 3-2. The first separation zone 316 is essentially a hole formed by the walls of the magnetic pole piece 320 and 304. The read element 310 and electrical connector 312 are positioned in the hole. The hole defines the first separation zone's width. The pole-shorted configuration maximizes the shielding performance when shorting the read element 310 to the pole 320 or pole 304 or both poles. However, this configuration is more difficult to manufacture.

This performance and manufacturing tradeoff for creating a hole is true for all the configurations described herein that permit shorting the poles to form the hole, regardless of whether the read element is electrically connected to the poles or not. In all configurations where both poles pieces are electrically connected together, both are also electrically connected to the same pole of the current source. Also, in all configurations where the poles are shorted and the read element is electrically connected to the poles, embodiments permit the read element to be connected to each pole with a separate connector, or the read element may only be connected to one pole via one conductor as is shown in FIG. 3-3.

Figure 4:
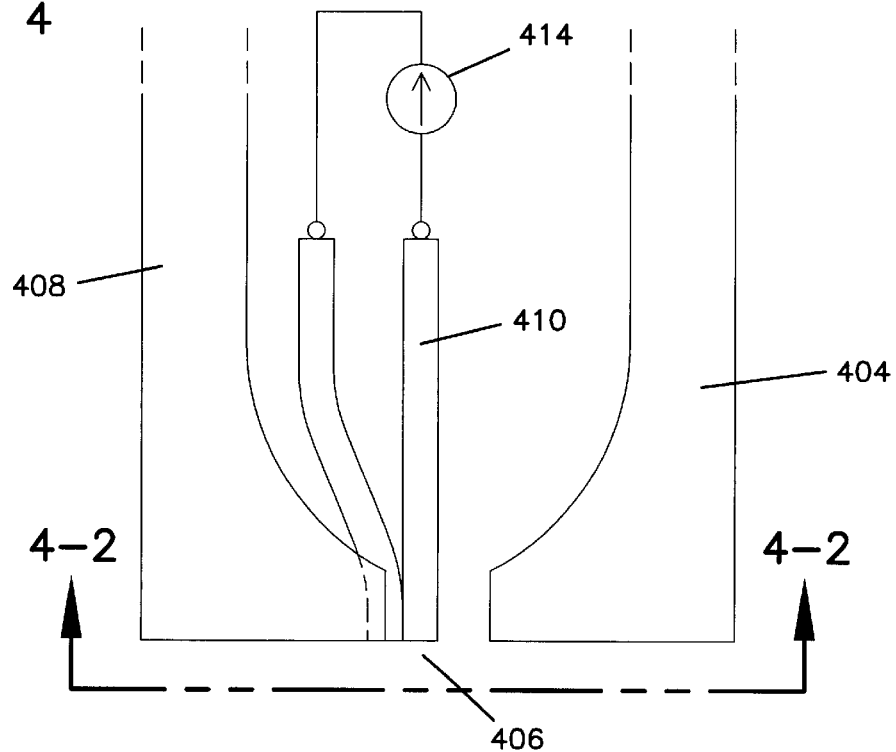
FIG. 4 shows a cutaway plan view of a read head that embodies an example of the present invention in a vertical current geometry with the read element folded.
Figures 2, 4:
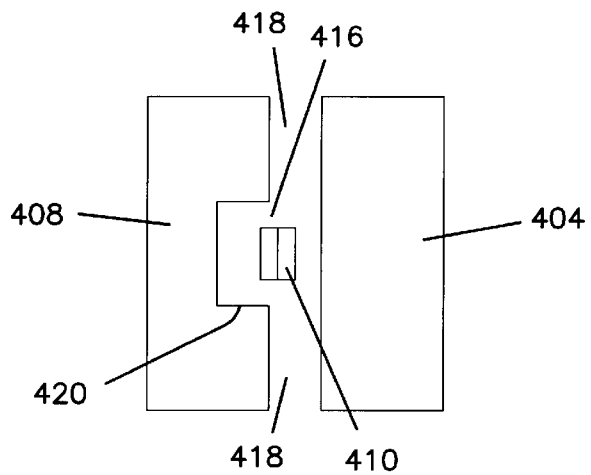
Figures 3, 4:
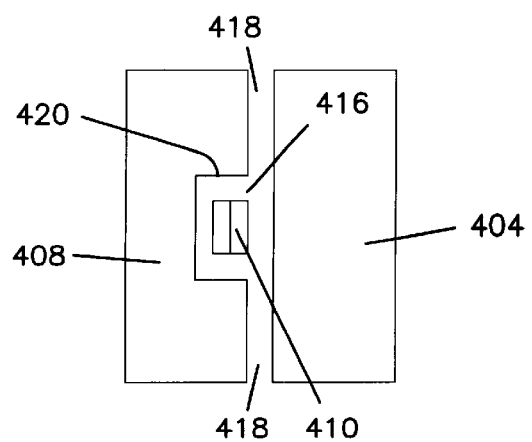

FIG. 4 shows a cutaway view of another head embodying the present invention. In this embodiment, the shared pole 408 and the bottom shield 404 are separated by a gap 406. The magnetoresistive read element 410 is folded so that current enters and exits from the biasing circuitry 414 to the read element 410 without entering one of the magnetic pole pieces 408 or 404. The folded configuration increases sensitivity to the magnetic flux received from the current data track. The sensitivity of the folded configuration approaches twice the sensitivity of using a non-folded magnetoresistive configuration. The increased sensitivity results from twice the number of layers of magnetoresistive material suspended above the current data track due to the fold. Typically, each side of the fold will have about 4 sensor layers that are 10–50 Å thick. The separation between the two sides of the fold is about 100–200 Å (not shown).

This embodiment also utilizes a vertical geometry where current flows through the length of the read element 410 vertically with respect to the horizontal plane of the recording medium. Since the current is flowing vertically, no conductors are necessary to the sides of the read element 410 that overlay the adjacent data tracks. The absence of these conductors permits the second separation width which defines the second separation zone 418 to be substantially reduced relative to the first separation width that defines the first separation zone 416.

FIG. 4-2 illustrates the ABS view taken along line 4-2 of FIG. 4. The shared pole 408 has a notch 420 created in the side facing the bottom shield 404. The read element 410 is partially enclosed by the notch 420 which defines the width of the first separation zone 416. The second separation zone 418 is narrow relative to the first separation zone 416 and thereby prevents stray magnetic flux from penetrating to the read element 410.

FIG. 4-3 illustrates an ABS view from the same vantage point as FIG. 4-2 but of a slightly different configuration. In FIG. 4-3, the notch 420 is created large enough to permit the entire portion of the folded read element that is suspended within the first separation zone 416 to reside within the notch 420. In this configuration, the distance from the edge of the read element 410 to the bottom shield is at least as great as the distance from the edge of the shared pole 408 to the bottom shield 404. As in FIG. 3-3, it is possible to provide a notch 420 that is large enough to enclose the read element 410 and permit the pole 408 and pole 404 to be shorted in the second separation zone 418 without shorting the read element 410 to either pole, though a conductor 312 in FIG. 3-3 does short the read element 310 to the pole 320. Such a conductor is not used in the embodiments shown in FIGS. 4-2 and 4-3 since current does not need to flow through either pole piece.

The notch 420 created in shared pole 408 shown in FIGS. 4-2 and 4-3 may also be created in the bottom shield 404 instead in some embodiments (not shown). In others (not shown), both the shared pole 408 and the bottom shield 404 may have notches that define the first separation zone 416. The notch may be created in either the shared pole, the bottom shield, or in both in any of the embodiments discussed herein. However, creating the notch in the shared pole is simpler to manufacture.

Figure 5:
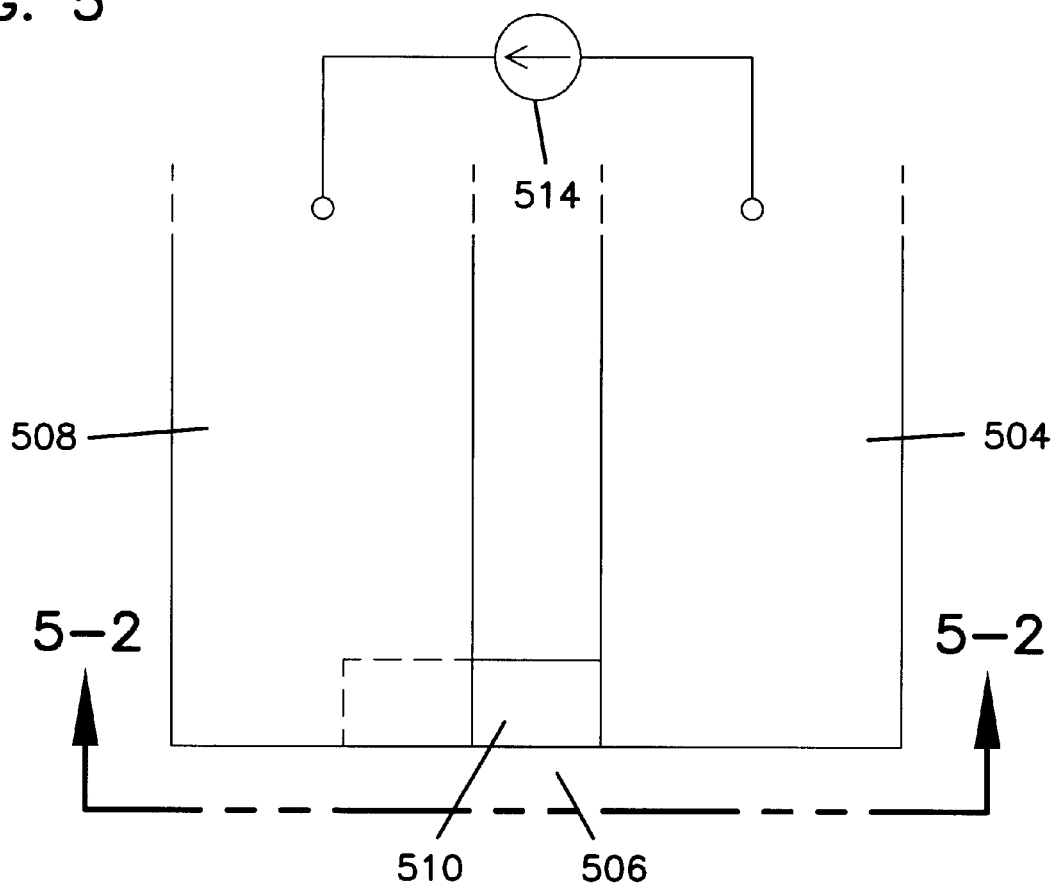
FIG. 5 shows a cutaway plan view of a read head that embodies an example of the present invention in a current-perpendicular-to-the-plane (CPP) geometry.
Figures 2, 5:
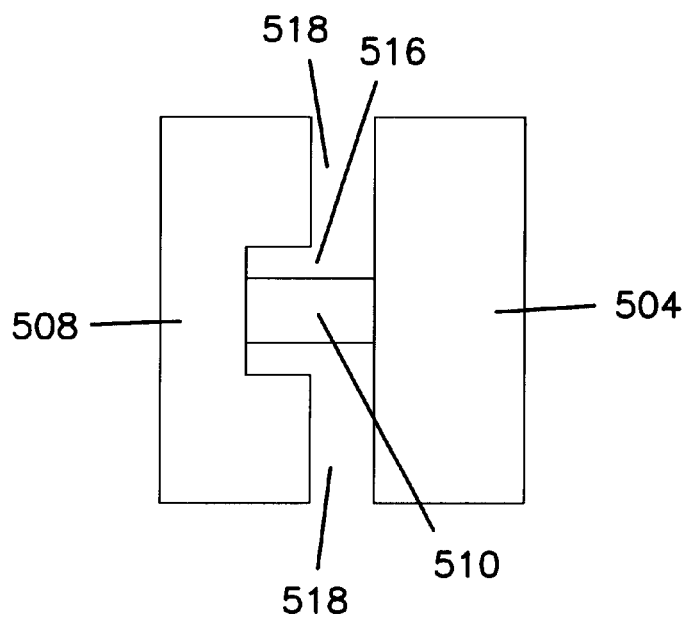

FIG. 5 shows a cutaway view of another head embodying the present invention. The shared pole 508 and bottom shield 504 are separated by a gap 506. A read element 510 bridges the gap 506 and creates a path for electrical current flow between the shared pole 508 and the bottom shield 504. The biasing circuitry 514 provides the electrical current to the poles 504 and 508 and the read element 510. This configuration is known as a current-perpendicular to the plane (CPP) geometry. The read element 510 is made of many adjacent layers of magnetoresistive material horizontally stacked. Rather than the current flowing through the longest dimension of each layer, as in configurations shown in FIGS. 2, 3, and 4, the current flows through each layers' least dimension. Current leaving one layer enters another until the current reaches the pole. Typically, the read element 510 consists of about 20 sensor layers (10 magnetic and 10 non-magnetic) with each being about 3–50 Å thick.

This embodiment utilizes the pole pieces 508 and 504 as replacements for the electrical conductors used in spin valve and anisotropic configurations. Because the electrical conductors are not present, the second separation zone's width is substantially less than the first separation zone's. This substantial difference prevents the stray magnetic flux from reaching the read element 510.

FIG. 5-2 shows an ABS view of the head taken along line 5-2 of FIG. 5. Read element 510 extends from the shared pole 508 to the bottom shield 504, within the first separation zone 516. The second separation zone 518 has a width that is less than the first separation zone's width. However, it is necessary that the second separation zone 518 have a width that is greater than zero to prevent the shared pole 508 and the bottom shield 504 from being electrically shorted together. If the poles are shorted, current will not flow through the read element 510 and the head is inoperable.

Figure 6:
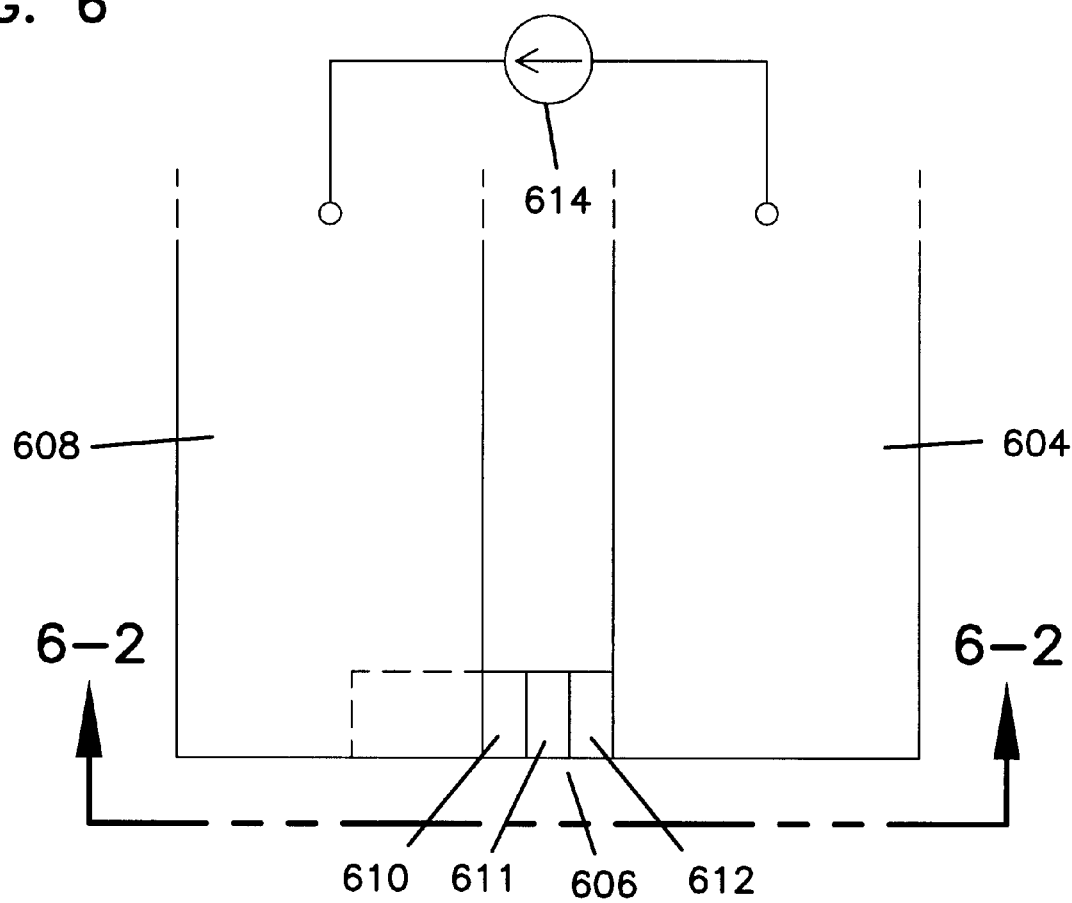
FIG. 6 shows a cutaway plan view of a read head that embodies an example of the present invention in a magnetic tunneling configuration.
Figures 2, 6:
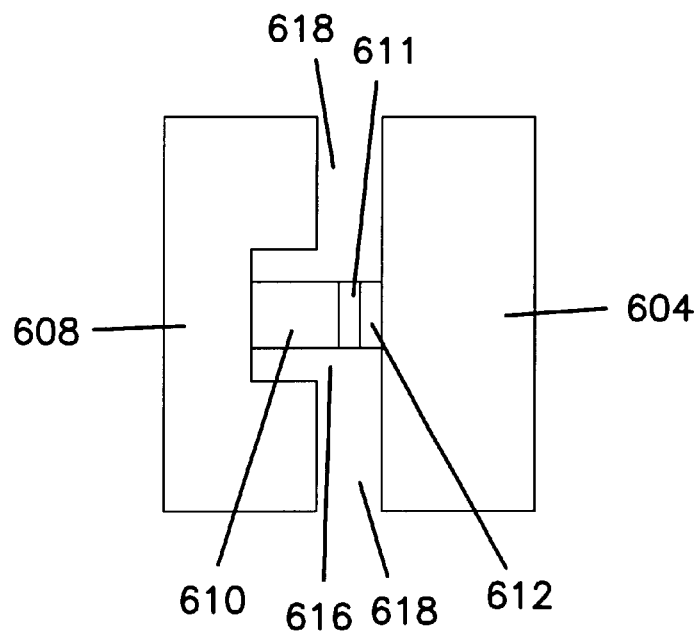

FIG. 6 shows another head that embodies the present invention. The shared pole 608 and the bottom shield 604 are separated by a gap 606. A read element is formed by two sets of magnetoresistive layers 610 and 612 separated by an insulator 611. Similar to the CPP head shown in FIG. 5, the current provided by the biasing circuitry 614 for the read element is transferred through both poles 608 and 604. This configuration is referred to as a spin tunneling head or a magnetic tunneling junction head. The current flows through the least dimension of the layers, which means current is perpendicular to the plane of each layer. One set of the magnetoresistive layers has a fixed magnetic orientation and another has a free magnetic orientation. The fixed magnetic orientation may be provided by the pole piece 608 acting as a permanent magnet to fix the vector in the set of layers 610. Otherwise permanent magnets could be provided on one side of the insulator 611, and the indentation to enclose the read element could be formed on the other side of the insulator 611.

The voltage drop across the read element will vary depending upon the magnetic orientation developed in the layer having the otherwise free orientation. The angle between the developed orientation and the fixed orientation will govern an electron's ability to tunnel through the insulator at a given voltage. Since the number of electrons passing through the insulator per unit of time will remain constant, the voltage drop will increase as the electron's ability to tunnel is decreased. This configuration provides a relatively high degree of sensitivity. Typically, each set of MR layers contains about 4 sensor layers with each being about 10–50 Å thick. The insulator is typically 4–10 Å thick.

Similar to the configuration shown in FIG. 5, this configuration replaces the electrical conductors used in spin valve and anisotropic configurations with the pole pieces 608 and 604 acting as conductors instead. The absence of the added electrical conductors permits the decreased width of the separation zone 618 that overlays the adjacent data tracks.

FIG. 6-2 shows an ABS view of the head of FIG. 6 taken along line 6-2 of FIG. 6. The shared pole 608 and the bottom shield 604 are separated by the first separation zone 616 and the second separation zone 618. The read element containing the two magnetoresistive layers 610 and 612 separated by an insulator 611 is positioned within the first separation zone 616. Since current flows between the pole pieces 608 and 604, through the first and second magnetoresistive layers 610 and 612, and through the insulator layer 611, the second separation width which defines the second separation zone must be greater than zero to prevent the two pole pieces from being electrically shorted. As in the CPP geometry, if the pole pieces 608 and 604 are shorted, no current flows through the read element and it is inoperable. The second separation width, though greater than zero, is less than the first separation width which defines the first separation zone. This variance in the widths prevents the stray flux from reaching the read element.

Figure 7:
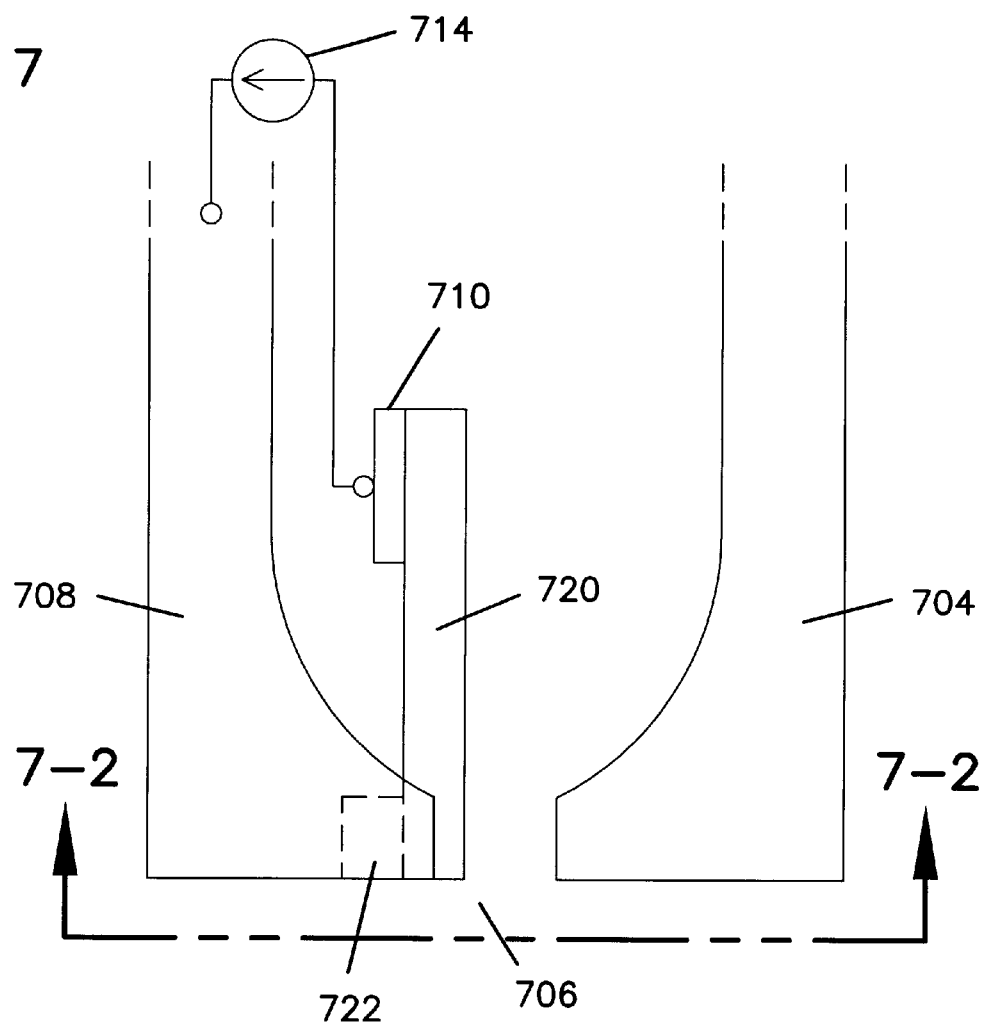
FIG. 7 shows a cutaway plan view of the read head that embodies an example of the present invention in a flux guide configuration.
Figures 2, 7:
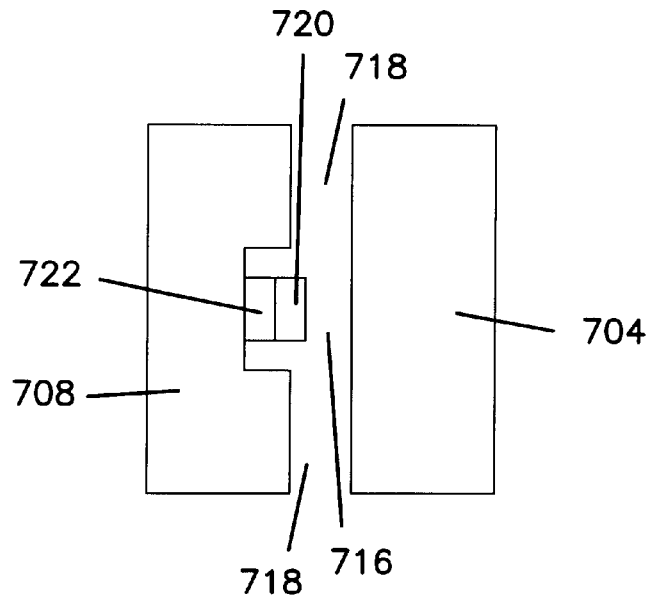

FIG. 7 shows yet another embodiment of the present invention. This cutaway view illustrates a head that utilizes a flux guide 720 as a read element to channel the magnetic flux from the current data track to the magnetoresistive element 710. Typically, the flux guide is made of permalloy or other soft magnetic material and is electrically connected to the shared pole 708 through a conductor 722. The shared pole 708 and the bottom shield are separated by a gap 706 which the flux guide 720 resides within. The magnetoresistive element 710 is usually a CPP or magnetic tunneling junction geometry.

This configuration allows the current to flow vertically through the shared pole 708, the magnetoresitive element 710, and the flux guide read element 720. No electrical conductors or stabilizing magnets are needed at the sides of the flux guide 720 that overlay the adjacent data tracks. Accordingly, the second separation zone 718 is narrower than would be possible if electrical conductors and/or permanent magnets were required at the sides.

FIG. 7-2 illustrates the ABS view taken along line 7-2 of FIG. 7. The shared pole 708 and the bottom shield 704 are separated by a first separation zone 716 and a second separation zone 718. The flux guide 720 and connector 722 reside within the first separation zone 716. The first separation zone 716 is defined by a first separation width, and the second separation zone 718 is defined by a second separation width. The first separation width is greater than the second separation width and the amount of off-track flux that reaches the flux guide and ultimately the read element is thereby reduced. As in the configurations of FIGS. 3 and 4, the flux guide configuration permits the second separation width that defines the second separation zone 718 to be reduced to zero. In this case (not shown), the flux guide 720 is enclosed in essentially a hole, and the pole pieces 708 and 704 are both electrically connected to the same pole of the current source 714.

To summarize exemplary embodiments of the present invention, there is a method for reducing off-track pick-up for a disc drive 100 having concentric data tracks and a read head with two magnetic pole pieces 308, 304 and a read element 310. The method has the following steps. The read element 310 is disposed in a first separation zone 316 formed between two magnetic pole pieces 308, 304. The read element 310 and the first separation zone 316 are positioned over a current data track. A second separation zone 318 is provided between the two magnetic pole pieces 308, 304 and is positioned over data tracks adjacent to the current data track. A first separation width is provided between the two magnetic pole pieces 308, 304 for the first separation zone 316. A second separation width is provided between the two magnetic pole pieces 308, 304 for the second separation zone 318 and is less than the first separation width.

In another exemplary embodiment, there is a read head for reducing off-track pick-up in a disc drive 100 having concentric data tracks. The read head has a first and second magnetic pole pieces 308, 304 disposed adjacently. A first separation zone 316 exists between the first and second magnetic pole pieces 308, 304 and is positioned over a current data track. The first separation zone 316 has a first separation width. A second separation zone 318 exists between the first and second magnetic pole pieces 308, 304 and is positioned over data tracks adjacent to the current data track. The second separation zone 318 has a second separation width that is less than the first separation width of the first separation zone 316. The read head also has a read element 310 disposed in the first separation zone 316 that senses magnetic flux that emanates from the current data track.

While the invention has been particularly shown and described with reference to preferred embodiments thereof, it will be understood by those skilled in the art that various other changes in the form and details may be made therein without departing from the spirit and scope of the invention.

What is claimed is:

1. A method for reducing off-track pick-up for a disc drive having concentric data tracks and a read head with a first magnetic pole piece and a second magnetic pole piece forming a read gap, and a read element, the method comprising the steps of:

disposing the read element in a first separation zone formed in the read gap between the first and second magnetic pole pieces, the read element and first separation zone being positioned over a current data track;

providing a second separation zone formed in the read gap between the first and second magnetic pole pieces, the second separation zone being positioned over data tracks adjacent to the current data track;

providing a first separation width between the first and second magnetic pole piece for the first separation zone;

providing a second separation width between the first and second magnetic pole pieces for the second separation zone, the second separation width being less than the first separation width.

2. The method of claim 1, wherein the data tracks are contained in a medium, the method further comprising the steps of:

rotating the medium to provide a stream of magnetic flux emanating from the current data track and representing data under the read/write head; and sensing the magnetic flux from the current data track with the read element;

wherein sensing by the read element of magnetic flux from data tracks adjacent to the current data track is avoided.

3. The method of claim 1, wherein the step of providing a first separation width further comprises the steps of creating a notch in at least one of the magnetic pole pieces forming the read gap and positioning the read element within the notch.

4. The method of claim 3, wherein the read element is completely disposed within the notch.

5. The method of claim 1, wherein the second separation width is zero.

6. The method of claim 1, wherein the read element is a giant magnetoresistive film.

7. The method of claim 6, wherein the giant magnetoresistive film is folded within the first separation zone.

8. The method of claim 1 wherein the read head has an electrical conductor, the method further comprising the step of biasing the read element with electrical current that transitions between the read element and an electrical conductor positioned within the first separation zone.

9. The method of claim 8, wherein the electrical conductor electrically connects the read element to at least one of the magnetic pole pieces forming the read gap.

10. The method of claim 1, wherein the step of providing a second separation width further comprises the step of making the second separation width greater than zero, the method further comprising biasing the read element with electrical current that transitions between the two magnetic pole pieces forming the read gap by passing through the read element.

11. The method of claim 1, wherein the read element is a flux guide, the method further comprising the steps of disposing a magnetoresistive element external to the first and second separation zones and electrically connecting the magnetoresistive element to the flux guide.

12. A read head for reducing off-track pickup in a disc drive having concentric data tracks, comprising:
   a first magnetic pole piece and a bottom magnetic pole piece disposed adjacently and forming a read gap;
   a first separation zone existing between the first and second magnetic pole pieces, the first separation zone being positioned over a current data track, the first separation zone having a first separation width;
   a second separation zone existing between the first and second magnetic pole pieces, the second separation zone being positioned over data tracks adjacent to the current data track, the second separation zone having a second separation width, the second separation width being less than the first separation width; and
   a read element disposed in the first separation zone, the read element for sensing magnetic flux emanating from the current data track.

13. The read head of claim 12, wherein the first separation zone is a notch in at least one of the pole pieces forming the read gap.

14. The read head of claim 13, wherein the read element is completely disposed within the notch.

15. The read head of claim 12, wherein the second separation width is zero.

16. The read head of claim 12, wherein the read element is a giant magnetoresistive film.

17. The read head of claim 16, wherein the magnetoresistive film is folded within the first separation zone.

18. The read head of claim 12, further comprising:
   biasing circuitry external to the first and second separation zones for providing an electrical current through the read element and at least one of magnetic pole pieces forming the read gap; and
   an electrical conductor positioned within the first separation zone for providing a path for electrical current between at least one of the magnetic pole pieces forming the read gap and the read element.

19. The read head of claim 12, wherein the read element is a flux guide, the read head further comprising:
   a magnetoresistive film disposed externally from the first and second separation zones, the magnetoresistive film electrically connected to the flux guide.

* * * * *